United States Patent
Ramaraju

(10) Patent No.: US 11,356,276 B2
(45) Date of Patent: Jun. 7, 2022

(54) DIGITAL DATA MANAGEMENT

(71) Applicant: BLOCKLYNCS LLC, Round Rock, TX (US)

(72) Inventor: Ravindraraj Ramaraju, Round Rock, TX (US)

(73) Assignee: R&D 3 LLC, Round Rock, TX (US)

( * ) Notice: Subject to any disclaimer, the term of this patent is extended or adjusted under 35 U.S.C. 154(b) by 135 days.

(21) Appl. No.: 16/998,988

(22) Filed: Aug. 20, 2020

(65) Prior Publication Data

US 2020/0382319 A1 Dec. 3, 2020

Related U.S. Application Data

(63) Continuation-in-part of application No. 16/546,154, filed on Aug. 20, 2019.

(60) Provisional application No. 62/890,427, filed on Aug. 22, 2019, provisional application No. 62/723,754, filed on Aug. 28, 2018, provisional application No. 62/898,306, filed on Sep. 10, 2019.

(51) Int. Cl.
*H04L 9/32* (2006.01)
*H04L 9/06* (2006.01)
*H04L 9/30* (2006.01)
*H04L 9/40* (2022.01)

(52) U.S. Cl.
CPC .......... *H04L 9/3247* (2013.01); *H04L 9/0637* (2013.01); *H04L 9/0643* (2013.01); *H04L 9/3026* (2013.01); *H04L 2209/38* (2013.01); *H04L 2209/56* (2013.01)

(58) Field of Classification Search
CPC ... H04L 9/3247; H04L 9/0637; H04L 9/0643; H04L 9/3026; H04L 2209/38; H04L 2209/56; H04L 63/12; H04L 9/3239
See application file for complete search history.

(56) References Cited

U.S. PATENT DOCUMENTS

| | | | | |
|---|---|---|---|---|
| 2020/0064805 | A1* | 2/2020 | Walter | G05B 19/05 |
| 2020/0184430 | A1* | 6/2020 | Umemoto | H04L 9/3242 |
| 2020/0228349 | A1* | 7/2020 | Basu | H04L 9/3255 |
| 2020/0304306 | A1* | 9/2020 | Cheung | H04L 9/14 |
| 2020/0389292 | A1* | 12/2020 | Bartolucci | H04L 9/3066 |
| 2021/0263907 | A1* | 8/2021 | Krueger | G06F 1/14 |

* cited by examiner

*Primary Examiner* — Darren B Schwartz
(74) *Attorney, Agent, or Firm* — Aruna Ghatak-Roy

(57) ABSTRACT

The present disclosure relates to methods of mining a block of a distributed ledger. The methods include: receiving a block to be mined, the block including a header hash and a plurality of transactions; creating a first signature based on a first function, where inputs to the first function include the header hash and the plurality of transactions; and creating a second signature based on a second function, where an input to the second function is the first signature. In one example, the second function is a multiplicative inverse function and the method further includes creating the second signature that is a multiplicative inverse value of the first signature with respect to a first irreducible polynomial. The method additionally includes creating a chain of signatures, where each of the signatures is a multiplicative inverse value of a previous output with respect to a respective irreducible polynomial.

20 Claims, 8 Drawing Sheets

DIGITAL DATA MANAGEMENT

CROSS REFERENCE TO RELATED APPLICATIONS

The present application is a continuation-in-part of U.S. application Ser. No. 16/546,154 titled "Digital Data Management," filed Aug. 20, 2019. The U.S. application Ser. No. 16/546,154, claims the benefit under 35 U.S.C. § 119(e) of U.S. Provisional Application No. 62/723,754 filed Aug. 28, 2018, titled "Digital Asset Management". The present application also claims the benefit under 35 U.S.C. § 119(e) of U.S. Provisional Application No. 62/890,427 filed Aug. 22, 2019, titled "Digital Asset Management". The present application also claims the benefit under 35 U.S.C. § 119(e) of U.S. Provisional Application No. 62/898,306 filed Sep. 10, 2019. All applications are incorporated herein by reference in their entirety.

BACKGROUND

Data stored in digital format may change ownership multiple times over the course of its lifetime. Additionally, data stored in digital format may be used to track transactions between two individuals. In one example, individuals sell or lease data stored in digital format and during the course of the data's lifetime, as the data changes ownership, the data or associated metadata may be altered without permission. This may occur despite efforts to secure a piece of digital data and associated metadata. For example, the piece of digital data may be stored on a central server and accessed through a centralized server system. However, the central server may still be hacked and in turn the piece of digital data and associated metadata may be altered. Accordingly, individuals wishing to exchange data stored in digital format or track transactions using digital format, face various challenges in the current systems such as maintaining the integrity of the data and associated metadata.

BRIEF DESCRIPTION OF THE DRAWINGS

For a detailed description of various embodiments, reference will now be made to the accompanying drawings in which.

DETAILED DESCRIPTION

Figure 1:
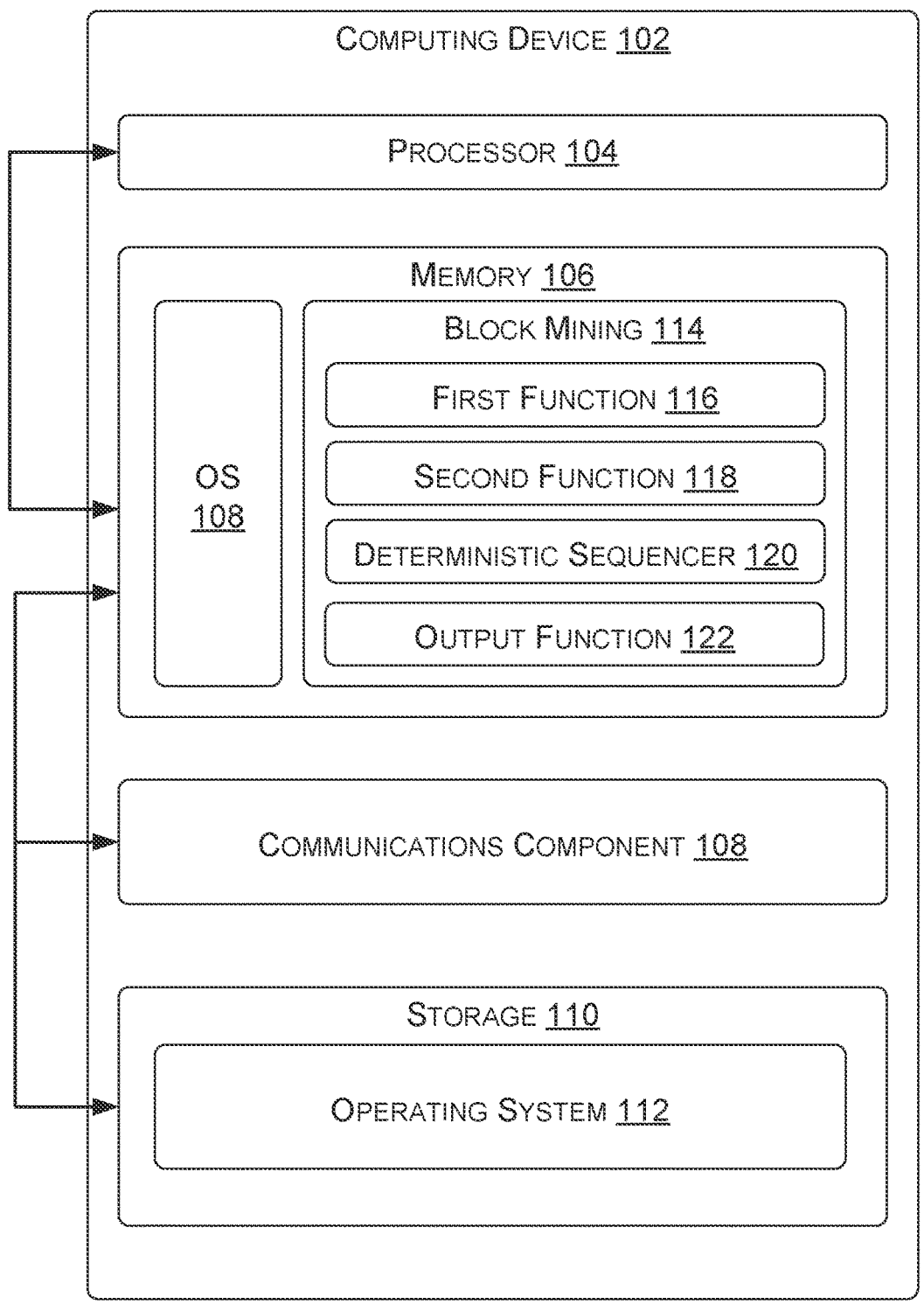
FIG. 1 shows, in block diagram form, an example computing device in accordance with at least some embodiments.

Certain terms are used throughout the following description and claims to refer to particular system components. As one skilled in the art will appreciate, different companies may refer to a component by different names This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Furthermore, references to a primitive polynomial and irreducible polynomial, as used herein, are interchangeable. The is, references to a primitive polynomial include an irreducible polynomial, and references to an irreducible polynomial include a primitive polynomial.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The ability to track the origin (i.e., an ownership chain) of a piece of digital data may be beneficial in several areas. The added ability to trust that the information pertaining to the ownership chain is immutable is also beneficial to several areas. For example, a customer may be interested in verifying that jewelry adheres to fair trade standards. That is, a customer may be interested in verifying the source of the jewelry is truly following certain labor and environmental guidelines. In another instance, a doctor or a health patient may be interested in tracking the source digital data associated with tissue sample.

As yet another example, a buyer of a piece of digital media (i.e., music, book, movie, etc. in a digital format) may be interested in verifying that they are buying a copy of the digital media that is authorized by a publisher or author. Alternatively, an author or publisher may be more inclined to offer for licensing or purchase, a piece of digital media on a marketplace platform, if the author or publisher trusts that the piece of digital media will not be illegally copied or pirated once the piece of digital media is released on the marketplace platform.

In an effort to capture digital data in an immutable format, the digital data may be stored on a distributed ledger. Currently, the methods in which a hash signature is mined for a block of data stored in the distributed ledger include large energy and time inefficiencies. The methods and techniques described herein are directed to creating signatures for a block of data stored in a distributed ledger that utilizes fewer computing resources and reduces time and energy inefficiencies present in current distributed ledgers.

FIG. 1 illustrates a computing device 102 configured to create a signature for a block of data placed in a distributed ledger system. In one example, the computing device 102 operates as part of a digital data management system that is able to track information pertaining to an ownership chain of a particular piece of digital data, where the ownership chain is immutable. In particular, FIG. 1 shows a high-level overview of a computing device 102, which as shown includes a processor 104, a memory 106, a communications component 108, and a storage 110 (e.g., a hard drive, a solid-state storage drive (SSD), etc.).

According to some embodiments, the computing device 102 represents any form of a computing device, or network of computing devices, e.g., a personal computing device, a desktop computing device, a rack-mounted computing device, and so on. It is noted that the foregoing example computing device is not meant to be limiting. On the contrary, the computing device 102 can represent any form of computing device without departing from the scope of this disclosure.

In some examples, the processor 104 is configured to work in conjunction with the memory 106 and the storage 110 to enable the computing device 102 to implement the various techniques set forth in this disclosure. According to some embodiments, the storage 110 represents a storage that is accessible to the computing device 102, e.g., a hard disk drive, a solid-state drive, a mass storage device, a remote storage device, and the like. In one example, the storage 110 is configured to store an operating system (OS) file system volume that is mounted at the computing device 102, where the OS file system volume includes an OS 112 that is compatible with the computing device 102.

According to some embodiments, and as shown in FIG. 1, the OS 112 can enable a variety of processes to execute on the computing device 102, e.g., OS daemons, native OS applications, user applications, and the like. For example, in FIG. 1, the OS 112 enables block mining 114 to execute on the computing device 102.

As described herein, block mining 114 mines a block of data by creating two different signatures based on different functions. Accordingly, in FIG. 1, the block mining 114 includes the first function 116 and the second function 118. Additionally, the block mining 114 utilizes a deterministic sequences 120 and an output function 122 during the method of creating a signature output.

As used herein, block mining refers to a process in which the computing device 102 solves a math problem to generate a signature, which in turn is used to secure the block of data and generate a link to the next block of data in the distributed ledger. The methods described herein generate several signatures to secure a block of data, where the several signature are generated in an order determined by the deterministic sequencer 120.

The several signatures are subsequently used to generate a signature output that is used to link the block of data to the next block of data. As described herein in one example, a combination of the several signatures is used to generate a hash that is the signature output.

The communications component 108 couples the computing device 102 to one or more networks including include local area networks (LAN) and wide area networks (WAN). The networks may include wired technologies (e.g., Ethernet®) and wireless technologies (e.g., WiFi®, code division multiple access (CDMA), global system for mobile (GSM), universal mobile telephone service (UMTS), Bluetooth ®, ZigBee ®, etc.). For example, the computing device 102 may use a wireless technology (e.g., WiFi ®, CDMA, GSM, etc.) to connect the computing device 102 to other computing devices, servers, or other networks. In another example, the computing device 102 uses a wired connection to connect the computing device 102 to other computing devices, servers, or other networks. Thus, the computing device 102 may communicatively couple to other devices or a network through various local and/or wide area networks, including a portion being a wireless network.

Figure 2:
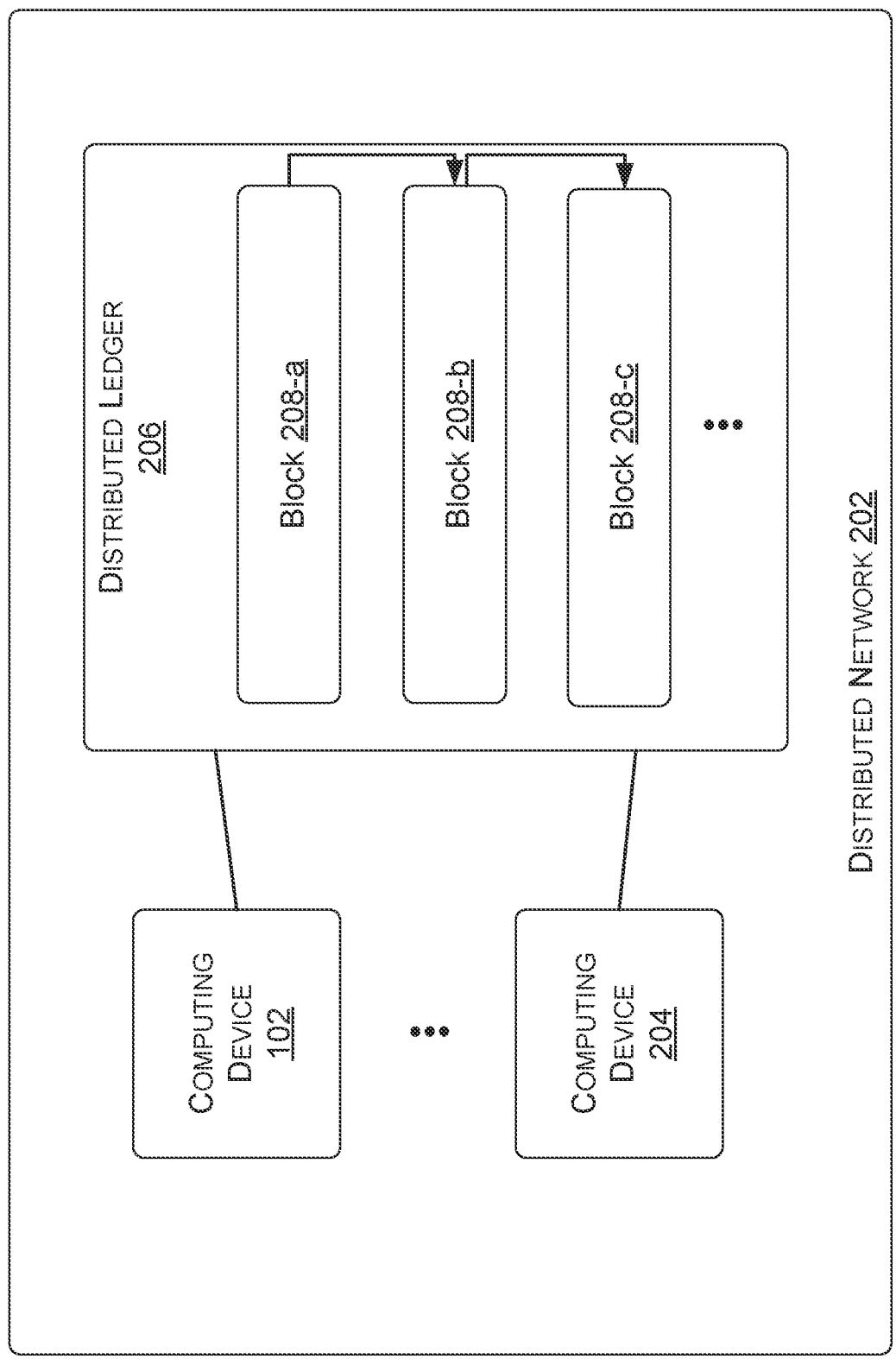
FIG. 2 shows, in block diagram form, an example computer architecture in accordance with at least some embodiments.

FIG. 2 illustrates the computing device 102 implemented within a distributed network 202 and coupled to a distributed ledger 206. In various embodiments, the computing device 102 is coupled to the distributed network 202 that includes computing nodes that collectively adhere to a protocol for internode communication and managing a distributed ledger such as a block chain. A computing node in the distributed network may include any computing device such as the computing device 102, computing device 204, or the like. A computing node may also include data centers. As used herein, a computing node may refer to any computing device or multiple computing device (i.e., a data center) that stores a copy of the distributed ledger 206 and adheres to the protocol for internode communication and managing the distributed ledger 206.

In some embodiments, the distributed network 202 may represent a distributed ledger-based distributed computing platform and operating system that features smart contract functionality. In some embodiments, a smart contract, according to various embodiments, includes a contract that is at least partially electronically self-executing. Smart contract terms may be stored on a distributed ledger (e.g., the distributed ledger 206) or blockchain for one or more contract execution programs to access. In some embodiments, one or more algorithms or executable code related to a smart contract may be stored on a digital ledger or block chain itself.

In various embodiments, a distributed ledger-based distributed computing platform may include a platform that utilizes a continuously growing list of records and executable code that form the distributed ledger 206. Further, the continuously growing list of records and executable code may be divided into sections called blocks, where individual blocks are linked to each other and collectively, all the blocks linked to each other at any particular moment in time are collectively referred to as the distributed ledger.

In FIG. 2, the distributed ledger 206 includes block 208-a, 208-b, and 208-c. The blocks 208 are examples, and in the example in FIG. 2, the block 208-b is linked to the block 208-a, and the block 208-c is linked to the block 208-b. Each of the blocks in the distributed ledger 206 may include a cryptographic hash of the previous block, a timestamp, and block data (e.g., transactions and executable code). Individual blocks such as block 208-a may be secured using techniques for secure communication, such as cryptography. In FIG. 2, the number of blocks in the distributed ledger 206 will continue to grow so long as the distributed network 202 is maintained and running Accordingly, the blocks 208-a, 208-b, and 208-c are representative of a portion of the distributed ledger 206 at a particular time, where at a time after the particular time, additional blocks may be added.

A copy of distributed ledger 206 resides within individual computing devices 102 and 204 that collectively form the distributed network 202. Further, although the distributed ledger 206 is illustrated in a separate box, the separate box is representative of what may be present on individual ones of the computing devices 102 and 204. That is, the box in FIG. 2 representing the distributed ledger 206 does not represent a computing device that the distributed ledger 206 is stored on, rather the box is representative of individual copies of the distributed ledger 206 present on individual instances of the computing devices 102 and 204. Thus, existing copies of the distributed ledger 206 may be found on the individual instances of the computing devices 102 and 204 in the distributed network 202.

Further, various computing nodes within the distributed network 202 may participate in different capacities. Individual instances of the computing devices 102 and 204 may store a copy of distributed ledger 206, while other computing devices both store a copy of distributed ledger 206 and perform mining tasks. For example, the computing device 102, may store the distributed ledger 206 and perform mining tasks related to maintaining the distributed ledger 206, while the computing device 102 stores the distributed ledger 206 without performing mining tasks.

In various embodiments, performing mining tasks may include a computationally intensive process that results in confirming transactions between parties, and creating a new block in the distributed ledger or block chain. For example, the computing device 102 may perform mining tasks including: verifying if transactions are valid, and performing computationally intensive operations to add a new block to the distributed ledger.

More specifically, a new block is added to the distributed ledger 206 after proof of work is completed, which includes a computationally intensive process for finding a particular hash signature of the new block. Accordingly, each block in the distributed ledger 206 is signed with an ending signature (e.g., a unique hash signature). And each of the blocks in the distributed ledger are linked to a block immediately preceding a particular block by referencing the unique hash signature of the block immediately preceding the particular block.

For example, the distributed ledger 206 may initially include block 208-*a*. In creating the block 208-*a*, the computing device 102 may create block 208-*a* by placing the ending signature of block 208-*a* in the header section of block 208-*b*, placing transaction data in the body of block 208-*b*, and perform proof of work in accordance with methods and techniques described herein to find an ending signature for block 208-*b*.

A new block may be added by any one of the computing nodes within the distributed network 202. When a new block is added by one of the computing nodes within the distributed network 202, other computing nodes within the distributed network 202 may also receive copies of the newly added block. For example, when the computing device 102 adds block 208-*b* to the distributed ledger 206, individual computing devices in the distributed network 202 may also receive copies of the block 208-*b* that the individual computing devices add to local copies of the distributed ledger 206 on the respective individual computing devices.

Once a new block is added (i.e., "recorded"), the data in preceding blocks cannot be altered retroactively without the alteration of all subsequent blocks, which requires a consensus of the distributed network 202 majority (e.g., majority of the computing devices 102, 204, etc.). Once block 208-*b* is added to the computing device 102, computing device 204, etc., the data in block 208-*b* cannot be altered retroactively without the alteration of all subsequent blocks. For example, the header of block 208-*b* contains the ending signature of block 208-*a*. If the data of block 208-*a* were changed, the ending signature of the block 208-*a* would be different from the one stored in the header of block 208-*b*. The link between block 208-*a* and block 208-*b* would be broken. Thus, the data in block 208-*a* cannot be changed retroactively without the alteration of all subsequent blocks including block 208-*b*, and 208-*c* (and the blocks following block 208-*c*).

The following example illustrates how difficult and nearly impossible it is to modify blocks in the distributed ledger 206. Suppose the computing device 102 attempts to change the data in block 208-*a* stored locally on the computing device 208-*a*. With respect to the distributed ledger 206 stored locally on the computing device 102, the link between the blocks 208-*a* and 208-*b* would be broken as the ending signature of the altered block 208-*a* would be different from the stored information in the header of the block 208-*b*. The computing device 102 may fix the broken link by updating the header of block 208-*b* to reflect the ending signature of the altered block 208-*a*, and subsequently update the header information of all subsequent blocks in the locally stored distributed ledger (e.g., block 208-*c*, etc.).

However, recall that copies of the distributed ledger 206 are stored on multiple computing nodes throughout the distributed network 202. Given the manner in which the individual computing nodes collectively adhere to a protocol for internode communication and managing the distributed ledger 206, the version of the distributed ledger 206 present on computing device 208-*a* will be rejected by the distributed network 202, because the version of the distributed ledger 206 on the computing device 102 is not what a collective majority of the computing nodes in the distributed network 202 have stored in its respective storage. Thus, given the manner in which the distributed ledger 206 is implemented using multiple computing nodes, the distributed ledger 206 is incredibly resistant to modification of the data included in the distributed ledger 206.

Figure 3A:
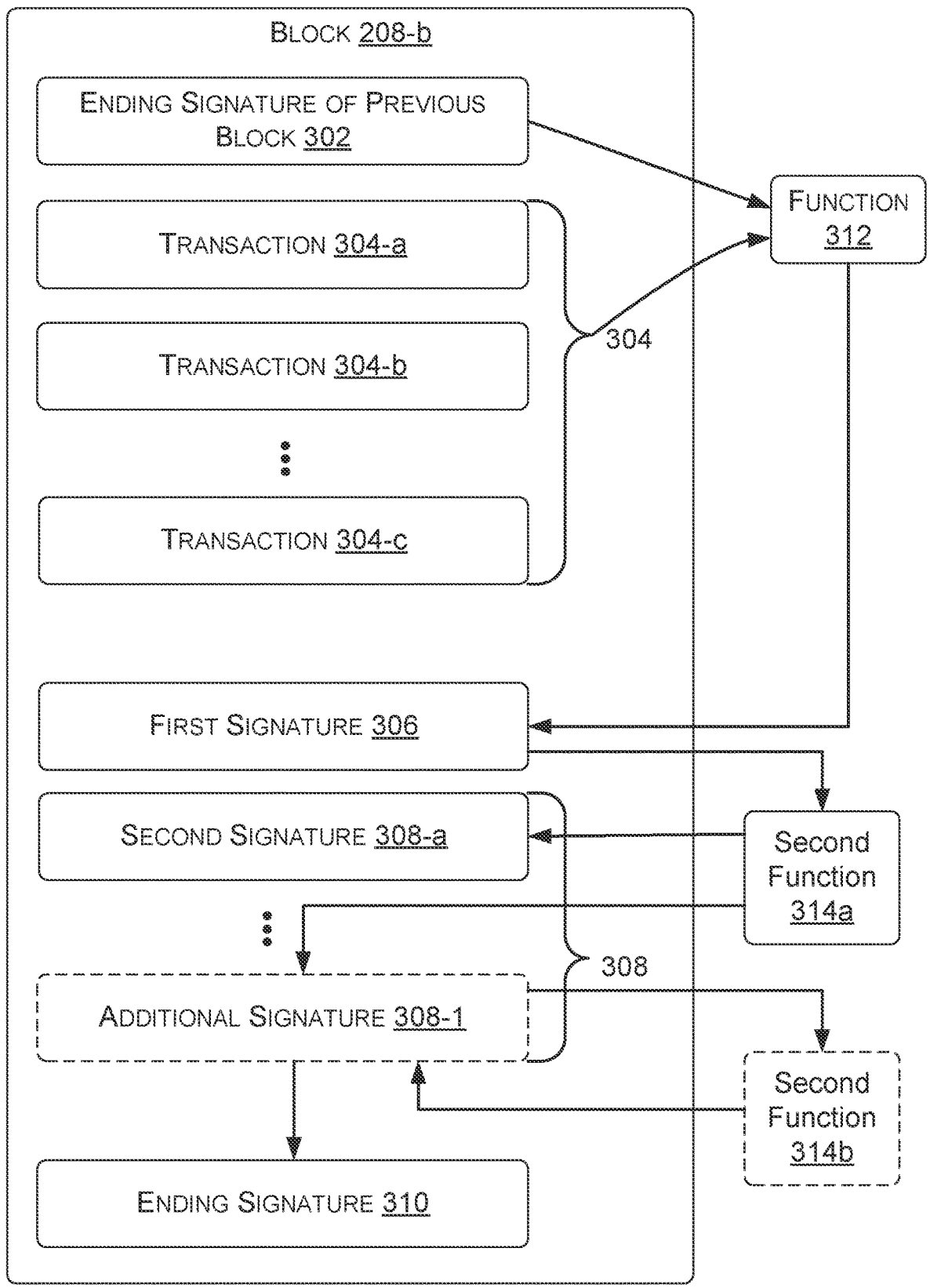
FIG. 3*a* shows, in partial block diagram form, an example block of data in accordance with at least some embodiments.
Figure 3B:
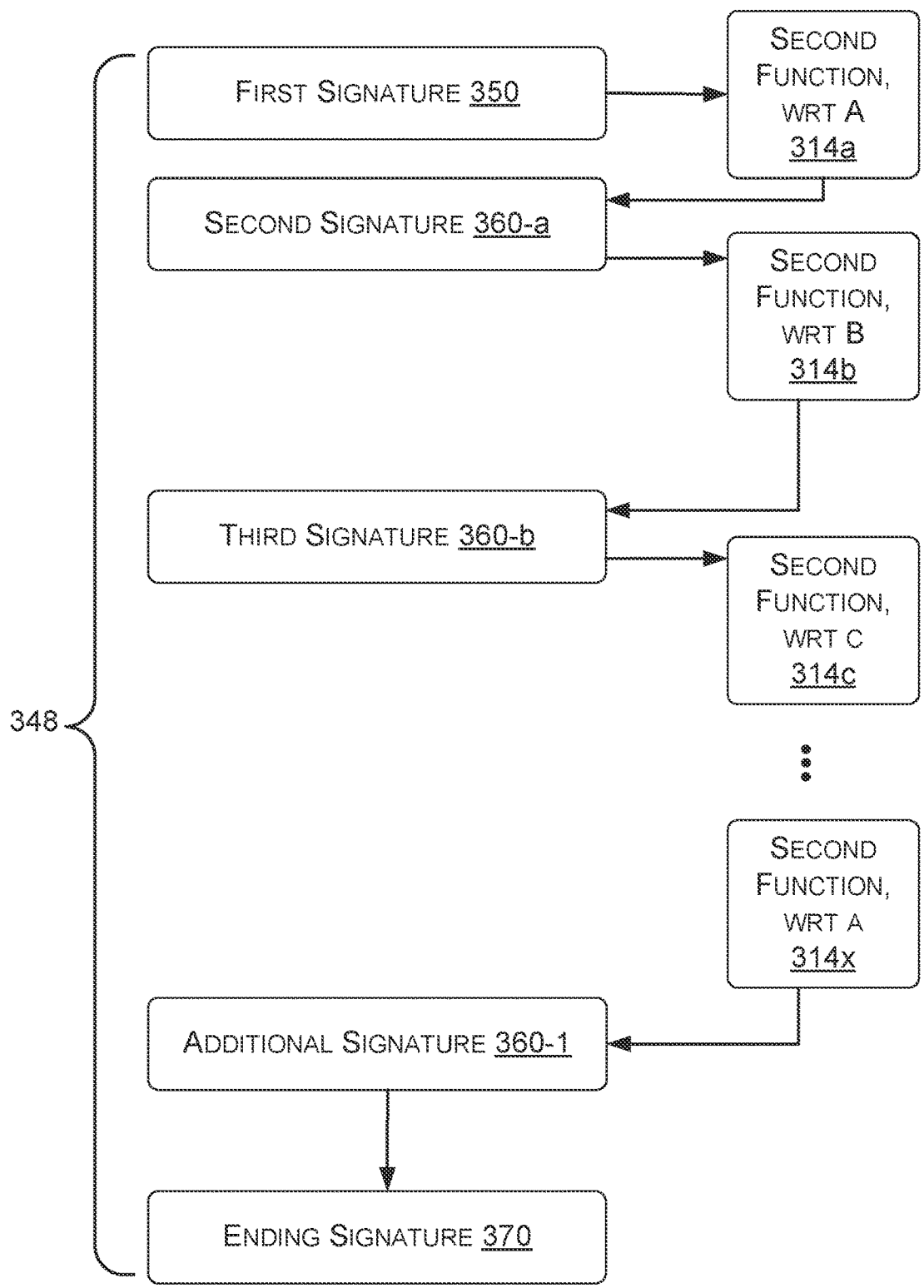
FIG. 3*b* shows, in partial block diagram form, an example block of data in accordance with at least some embodiments.

The concept of the distributed ledger is changing distributed database technology. However, current methods of adding blocks to a distributed ledger can use around petaflops of computing capacity which in turn uses gigawatts of electricity. Sometimes the annual consumption of a distributed ledger is equal to an amount of electricity consumed by a small country. Various solutions described herein are directed to maintaining the security of a distributed ledger, but reducing the amount of energy consumed in the process of creating and adding a block to the distributed ledger. The methods described herein include using finite field properties and Byzantine fault tolerant algorithms to create high transaction speed throughputs that scale with the number of nodes in the network by lowering the energy requirement. In FIGS. 3*a* and 3*b*, examples are illustrates of creating a signature that maintains security but which uses less energy to create signatures.

FIG. 3*a* illustrates aspects of the example block 208-*b*. The block 208-*b* includes an ending signature of the previous block 302, a block of transactions 304, a first signature 306, a chain of signatures 308, and an ending signature 310. In various embodiments, the ending signature of the previous block 302 is a hash value of a compilation of signatures in the previous block. As described with regards to the ending signature 310 of the block 208-*b*, the ending signature is created by function, e.g., a hash function. Thus, the ending signature of the previous block 302 can also referred to herein as a header hash.

The block of transactions 304 include various digital data that are stored in the respective block of the distributed ledger. In some embodiments, the first signature 306 is associated with the ending signature 302 (i.e., the header hash) and the block of transactions 304 by a function 312—e.g., a hash function. In one example, the ending signature 302 and the block of transaction 304 are concatenated to create a concatenated output. The concatenated output is an input to the function 312 and the output of the function 312 is the first signature 306. In some examples, the function 312 is a predefined, deterministic, one-way function.

As used herein, a deterministic function provides a unique value for any input in its domain. Further, as used herein, a one-way function is one in which for a given input, a unique output is created. However, given the unique output, the given input is not discernible using the one-way function. That is, the output cannot be directly mapped back to the input.

The block 208-b also includes second signature 308-a. In various examples, the block 208-b includes only one second signature 308-a. In other examples, the block 208-b includes a plurality of signatures 308 following the first signature 306 (e.g., a chain of signatures). The plurality of signatures 308 are created using methods similar to methods used to create the second signature 308-a.

Specifically, the second signature 308-a is created using a second function 314. In various embodiments, the second function 314 represents a predefined and deterministic function. The second function 314 may be two-way, where a given input results in a unique output. And conversely, given the unique output and the second function 314, the given input may be determined. In one example, the second function 314 is a multiplicative inverse function with respect to an irreducible polynomial.

In various embodiments, the second signature 308-a is created by providing the first signature 306 as an input to the second function 314a, with respect to an irreducible polynomial. The output is a multiplicative inverse with respect to the irreducible polynomial, and the output is the second signature 308-a. Additional signatures following the second signature 308-a may be created using the second function but with respect to a different irreducible polynomial. And accordingly, a chain of signatures may be created where a previous signature is linked to a subsequent signature by way of the second function 314.

For example, the second signature 308-a is an input to the second function 314b, with respect to a second, different irreducible polynomial, and the output is the additional signature 308-1. As described further in FIG. 3b, the order in which different irreducible polynomials are used with the second function, may be predefined. Additionally, the sequence of different irreducible polynomials may be repeated for a predetermined number of times. Accordingly, the signatures 308 are created using a predefined and deterministic function.

The block 208-b also includes an ending signature 310. In various embodiments, the ending signature 310 is created as an output of a one-way function, similar to the function 312. In one example, the ending signature 310 is a hash of the first signature 306 and any additional second signatures 308 (where the additional second signatures is one or more additional second signatures). In one example, each of the signatures is 310 and 318 are concatenated to create a concatenated result. The concatenated result serves as an input to a hash function, or a function like the function 312, and the output of the hash function is the ending signature 310.

FIG. 3b illustrates additional aspects of an example block 208 in the distributed ledger. In particular, FIG. 3 illustrates aspects corresponding to creating the additional signatures 360. The chain of signatures 348 in the example block 208 includes the first signature 350, the second signature 360-a, the third signature 360-b, additional signature 360-1. The chain of signatures 348 are combined (e.g., concatenated, added) in a manner that creates an output that is provided to a hash function. The output of the hash function creates the ending signature 370. The ending signature 370, in turn, is placed on a subsequent data block in the distributed ledger (e.g., the block 208 is linked to the next block by the ending signature 370).

The second signature 360-a is created by solving for a multiplicative inverse given the value of the first signature and with respect to an irreducible polynomial (e.g., a primitive polynomial). In one example, the second signature 360-a is created through the use of a Galois finite field theory.

By definition, a Galois finite field defines a multiplicative group that is cyclic. In one example, the number of primitive polynomials of degree n over GF(2) is given by the following equation:

$$a_2(n) = \frac{\phi(2^n - 1)}{n} \quad (1)$$

where $a_2(n)$ represents the number of primitive polynomials of degree n over GF(2), and $\phi(n)$ is the totient function. The multiplicative group of $GF(2^n)$ has $(2^n-1)$ elements and each element in the group has a unique multiplicative inverse.

According to finite field theory, there is a finite field of order q, where:

$$q = p^n \quad (2)$$

further where p is a prime and all others finite field of order q are isomorphic to the GF(q). The primitive polynomial of degree n generates all the elements of the multiplicative group of GF $(2^n)$ with coefficients from the base field GF (2). The elements of the multiplicative group of GF $(2^n)$ are generated by each unique primitive polynomial. Thus, each unique primitive polynomial will have a different unique representation based on the root of each primitive polynomial in the extension of GF $(2^n)$. No two primitive polynomial generators will produce the same multiplicative inverse representation for an element in the multiplicative group of GF $(2^n)$ except for the multiplicative identity element.

To illustrate how these properties of the Galois finite field may be used to create the additional signatures 360, consider the example in which the Galois finite field is:

$$F_2^3[x]/GF(2^3) \quad (3)$$

where, $F_2^3[x]$ is the extension field over GF(2) of order $2^3$. The elements of this field are 0, 1, x, x+1, $x^2$, $x^2+1$, $x^2+x$, $x^2+x+1$. In binary form, these elements may be represented as 000, 001, 010, 011, 100, 101, 110, and 111. In this example, the each of the binary values are the coefficients of the polynomial. The finite field: $F_2^3[x]/GF(2^3)$ is generated by the primitive polynomials $x^3+x+1$ and $x^3+x^2+1$ in $F_2$. The roots of primitive polynomial $x^3+x+1$ and $x^3+x^2+1$ in the finite field $F_2^3[x]/GF(2^3)$ generate all the elements of the multiplicative group of the finite field $F_2^3[x]/GF(2^3)$.

The roots of irreducible polynomials in $x^3+x+1$ and $x^3+x^2+1$ in the extension field $F_2^3[x]/GF(2^3)$ are:

$$\alpha^3 = \alpha + 1 \quad (4)$$

and $$\beta^3 = \beta^2 + 1 \quad (5)$$

where $\alpha$ and $\beta$ is are elements of the extension field.
The various powers of the roots generate all the elements in the finite field $F_2^3[x]/GF(2^3)$ where $\beta^7 \equiv 1 \mod(x^3+x+1)$ and $\beta^7 \equiv 1 \mod(x^3+x^2+1)$. In furtherance on this example, the tables 1 and 2 illustrates various aspects of the example. For example, the table 1 illustrates elements of $F_2^3[x]$ and the corresponding powers of $\alpha$ and $\beta$. The table 2 illustrates the multiplicative inverse of each elements in $F_2^3[x]$ generated by the roots of the primitive polynomials.

TABLE 1

| $x^2$ | x | 1 | $\alpha^3 = \alpha + 1$ | $\beta^3 = \beta^2 + 1$ |
|---|---|---|---|---|
| 0 | 0 | 0 | — | — |
| 0 | 0 | 1 | $\alpha^0$ | $\beta^0$ |
| 0 | 1 | 0 | $\alpha$ | $\beta$ |
| 0 | 1 | 1 | $\alpha^3$ | $\beta^5$ |
| 1 | 0 | 0 | $\alpha^2$ | $\beta^2$ |
| 1 | 0 | 1 | $\alpha^6$ | $\beta^3$ |
| 1 | 1 | 0 | $\alpha^4$ | $\beta^6$ |
| 1 | 1 | 1 | $\alpha^5$ | $\beta^4$ |

TABLE 2

| elements | $\alpha^3 = \alpha + 1$ | $\beta^3 = \beta^2 + 1$ |
|---|---|---|
| 1 | 1 | 1 |
| x | $x^2 + 1$ | $x^2 + x$ |
| x + 1 | $x^2 + x$ | $x^2$ |
| $x^2$ | $x^2 + x + 1$ | x + 1 |
| $x^2 + 1$ | x | $x^2 + x + 1$ |
| $x^2 + x$ | x + 1 | x |
| $x^2 + x + 1$ | $x^2$ | $x^2 + 1$ |

In FIG. 3b, the example second function 314a is used to determine a multiplicative inverse with respect to a certain irreducible polynomial (e.g., primitive polynomial A) given the first signature 350 to create the second signature 360-a. In turn the third signature 360-b is created using the example second function 314b to determine a multiplicative inverse with respect to a different irreducible polynomial (e.g., primitive polynomial B) given the second signature 360-a.

Of note, each time an additional signature is added to the chain of signatures 348 that is created using the second function 314, the irreducible polynomial used in conjunction with the second function may be varied. In the example in FIG. 3b, the second signature 360-a is created using irreducible polynomial A, the third signature 360-b is created using irreducible polynomial B. A signature following the third signature may be created using irreducible polynomial C.

The different irreducible polynomials used to create each of the signatures may be defined in a certain order (e.g., A, B, C). Additionally, depending on a length of the chain of signatures 348, the order of the different irreducible polynomials may be repeated (e.g., A, B, C, A, B, C). In various embodiments, the order in which the different irreducible polynomials are used to create the chain of signatures can be defined in any manner, using any pattern, and ordering.

In some embodiments, the entire order irreducible polynomials is defined, while in other embodiments, a subset of the order is predefined, where the subset is repeated. Recall also, in some embodiments, the process of using the second function 314a to create the second signature 360-a is applied only once, and thus, a block of data includes the first signature 350 and the second signature 360-a and the ending signature 370.

The ending signature 370 is a final signature of the block which is used to link the block 208 to a subsequent block. That is, the ending signature 370 forms a header in the subsequent block. In various embodiments, the chain of signatures 348 is concatenated to create a concatenated output. A hash of the concatenated output is generated to create the ending signature 370. In various embodiments, the chain of signatures 348 are combined in any known manner and correlated to a single output, where the single output is processed by a hash function to generate the ending signature 370.

The manner in which the chain of signatures 348 and the ending signature 370 are create demonstrate a manner that uses less energy than is used by methods solving for a nonce value. The methods described herein use finite field properties to create high transaction speed throughputs that scale with the number of nodes in the network without resulting in scaling of the energy consumption as well. The methods described herein create a signature that maintains security without being associated with large energy consumption.

Figure 4:
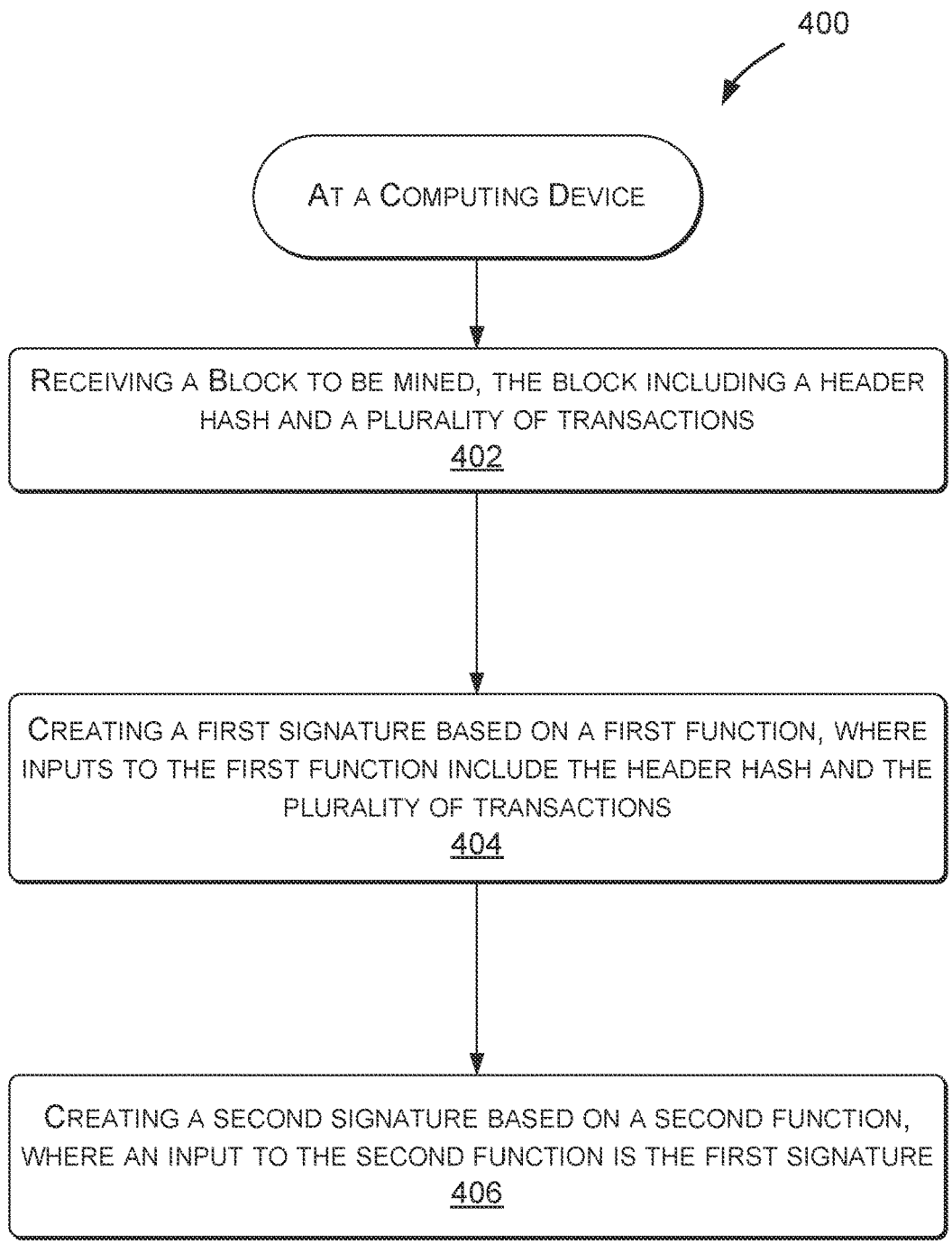
FIG. 4 shows an example method in accordance with at least some embodiments for mining, by a computing device, a block of data.

FIG. 4 illustrates an example method 400. The method may be performed by any suitable computing device, such as the one discussed in FIG. 1, that supports creating signatures in a manner discussed. In various embodiments, some of the blocks shown in FIG. 4 may be performed concurrently, in a different order than shown, or omitted. Additional method elements may be performed as desired.

Initially the method starts at a computing device, where the computing device receives a block to be mined, where the block includes a header hash and a plurality of transactions (block 402). Next the method includes creating a first signature based on a first function, where inputs to the first function include the header hash and the plurality of transactions (block 404).

Next, the method includes creating a second signature based on a second function, where an input to the second function is the first signature (block 406). As described herein, in one example, the second signature is a multiplicative inverse value of the first signature with respect to an irreducible polynomial.

Figure 5:
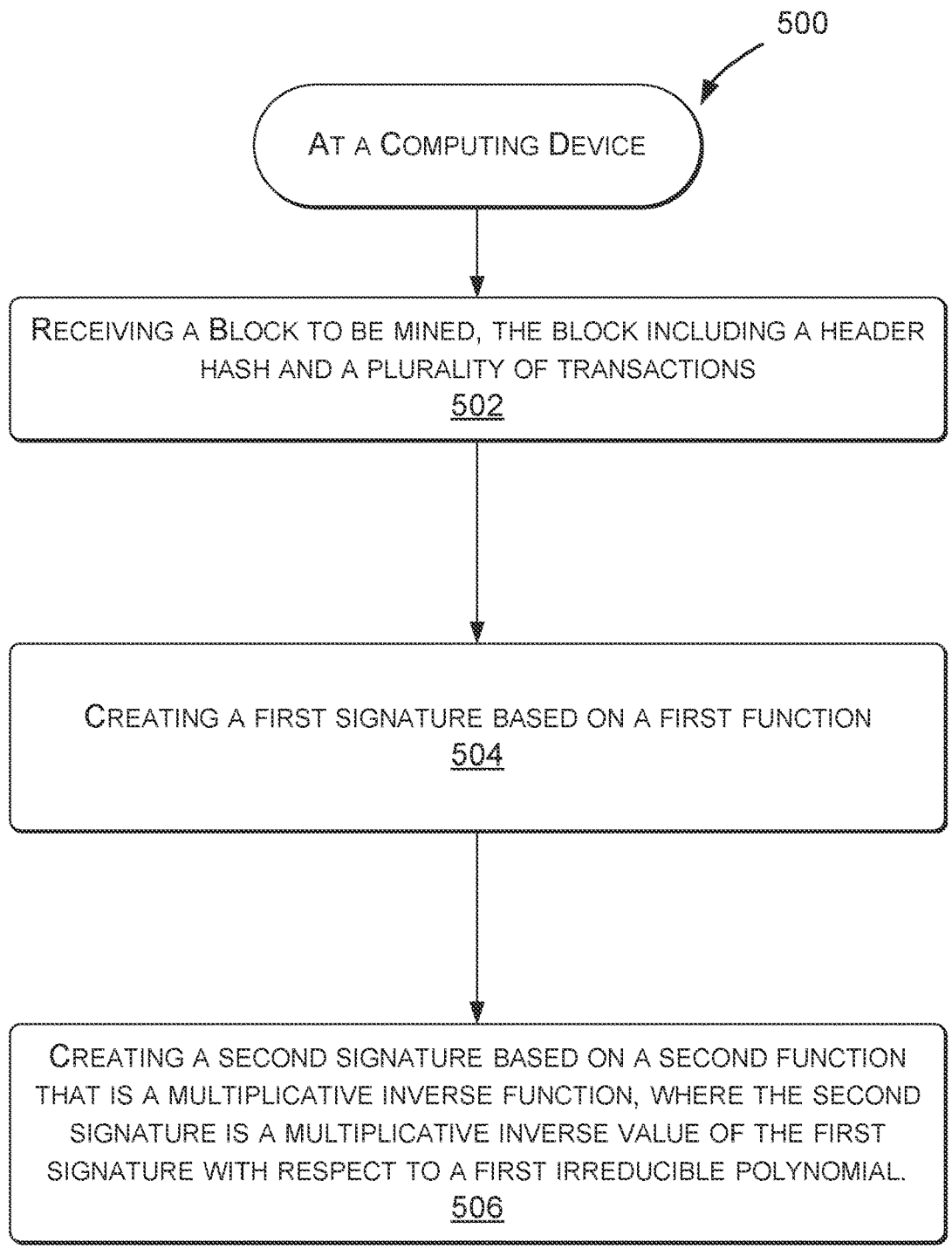
FIG. 5 shows an example method in accordance with at least some embodiments for mining, by a computing device, a block of data.

FIG. 5 illustrates an example method 500. The method may be performed by any suitable computing device, such as the one discussed in FIG. 1, that supports creating signatures in a manner discussed. In various embodiments, some of the blocks shown in FIG. 5 may be performed concurrently, in a different order than shown, or omitted. Additional method elements may be performed as desired.

Initially, the method starts at a computing device, where the computing device receives a block to be mined, where the block includes a header hash and a plurality of transactions (block 502). Next the method includes creating a first signature based on a first function (block 504). Next, the method includes creating a second signature based on a second function that is a multiplicative inverse function, where the second signature is a multiplicative inverse value of the first signature with respect to a first irreducible polynomial (block 506).

Figure 6:
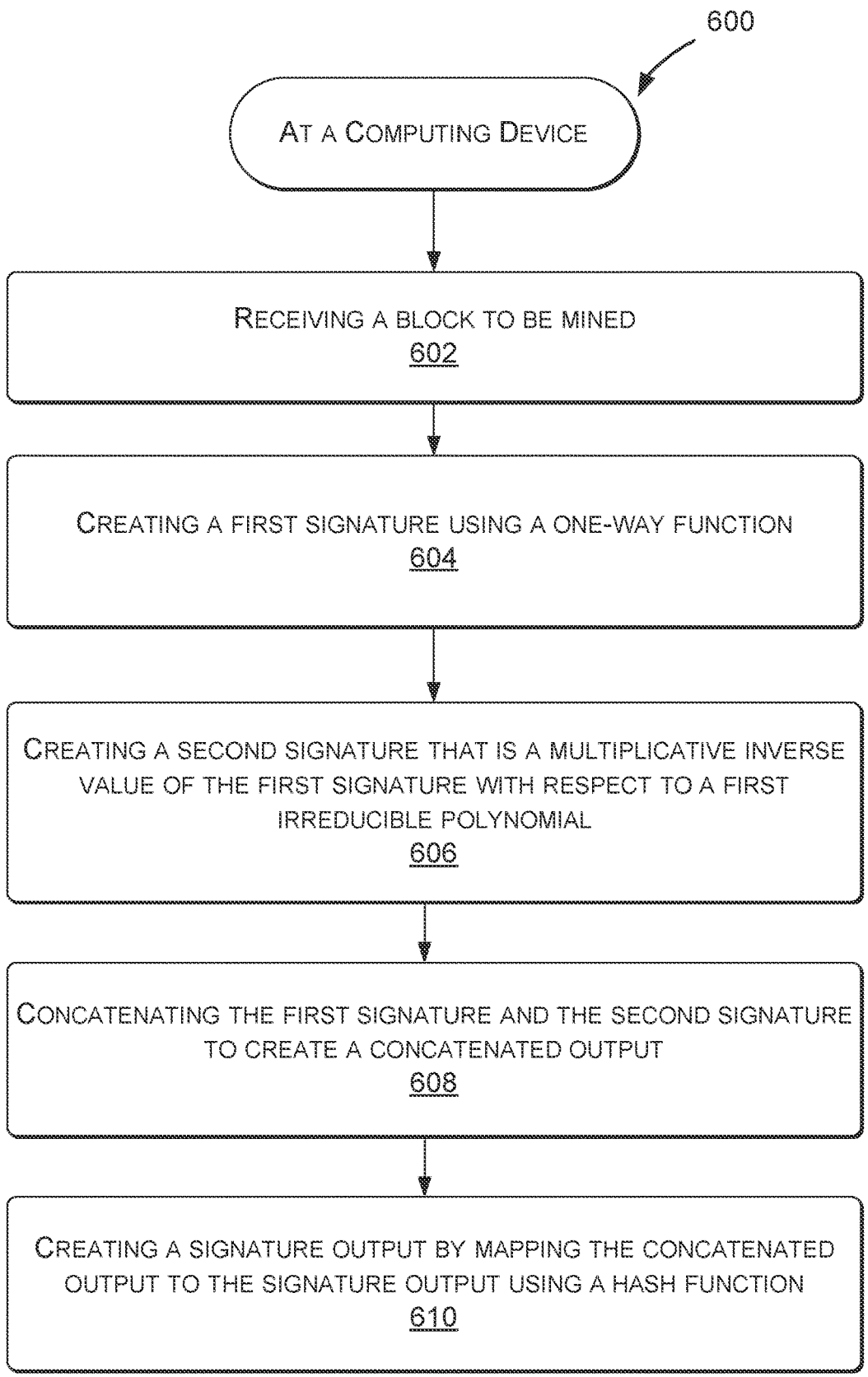
FIG. 6 shows an example method in accordance with at least some embodiments for mining, by a computing device, a block of data.

FIG. 6 illustrates an example method 600. The method may be performed by any suitable computing device, such as the one discussed in FIG. 1, that supports creating signatures in a manner discussed. In various embodiments, some of the blocks shown in FIG. 6 may be performed concurrently, in a different order than shown, or omitted. Additional method elements may be performed as desired.

Initially, the method starts at a computing device, where the computing device receives a block to be mined (block 602). Next, the method includes the computing device creating a first signature using a one-way function (block 604), and creating a second signature that is a multiplicative inverse value of the first signature with respect to a first irreducible polynomials (block 606).

Next, the method includes the computing device concatenating the first signature and the second signature to create a concatenated output (block 608). Finally, the method includes the computing device creating a signature output by mapping the concatenated output to the signature output using a hash functions (block 610).

Figure 7:
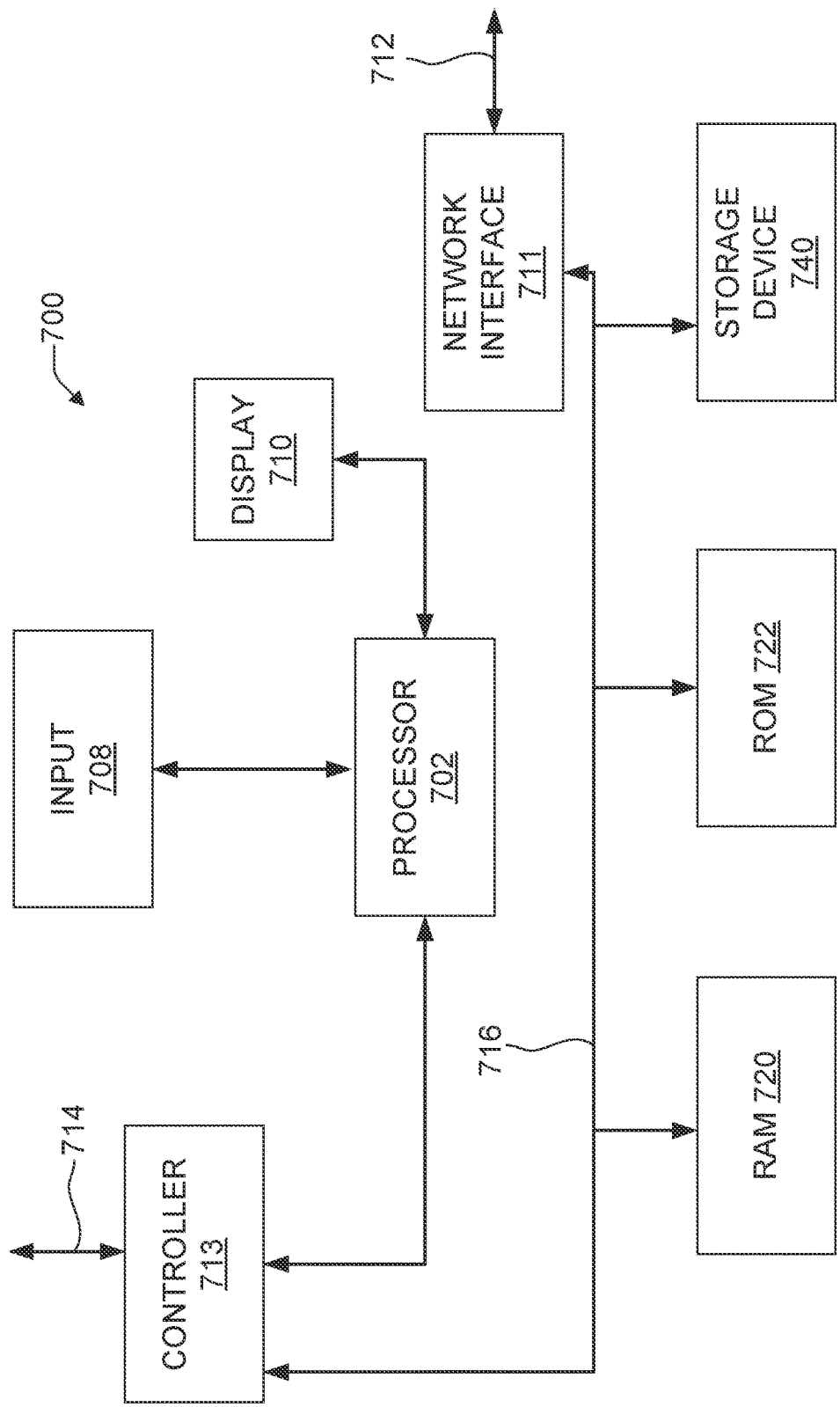
FIG. 7 shows a computing device, in accordance with at least some embodiments.

FIG. 7 illustrates a detailed view of a computing device 700 that can be used to implement the various components described herein, according to some embodiments. In particular, the detailed view illustrates various components that can be included in the computing device 102 illustrated in FIG. 7. As shown in FIG. 7, the computing device 700 can include a processor 702 that represents a microprocessor or controller for controlling the overall operation of the computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, and so on. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

As noted above, the computing device 700 also includes the storage device 740, which can comprise a single disk or a collection of disks (e.g., hard drives), and includes a storage management module that manages one or more partitions within the storage device 740. In some embodiments, storage device 740 can include flash memory, semiconductor (solid-state) memory or the like. The computing device 700 can also include a Random-Access Memory (RAM) 720 and a Read-Only Memory (ROM) 722. The ROM 722 can store programs, utilities or processes to be executed in a non-volatile manner The RAM 720 can provide volatile data storage, and stores instructions related to the operation of processes and applications executing on the computing device 102, including at least the block mining 114.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

What is claimed is:

1. A method of mining a block of a distributed ledger, the method comprising:
   receiving a block to be mined, the block comprising a header hash and a plurality of transactions;
   creating a first signature based on a first function, wherein inputs to the first function include the header hash and the plurality of transactions;
   creating a second signature based on a second function that is a multiplicative inverse function, wherein an input to the second function is the first signature and the second signature is a multiplicative inverse value of the first signature with respect to a first irreducible polynomial; and
   amending the block to include the first and second signatures.

2. The method of claim 1, wherein the first function is a one-way function.

3. The method of claim 2, wherein the one-way function is a hash function.

4. The method of claim 1, further comprising:
   concatenating the first signature and the second signature to create a concatenated output; and
   creating a signature output by mapping the concatenated output to the signature output using a hash function.

5. The method of claim 1, wherein an order of signatures used to create a signature output is defined before the block to be mined is received.

6. The method of claim 1, further comprising:
   creating a chain of signatures, wherein each of the signatures is a multiplicative inverse value of a previous output with respect to a respective irreducible polynomial.

7. The method of claim 1, wherein the first irreducible polynomial is a primitive polynomial.

8. The method of claim 4, further comprising, amending the block to include the signature output.

9. A distributed ledger implemented, at least in part, on a system, the system comprising:
   a processor;
   a non-transitory computer-readable media storing instructions that, when executed by the processor, causes the processor to:
      receive a block to be mined, the block comprising a header hash and a plurality of transactions;
      create a first signature based on a first function, wherein inputs to the first function include the header hash and the plurality of transactions; and
      create a second signature based on a second function that is a multiplicative inverse function, wherein an input to the second function is the first signature and the second signature is a multiplicative inverse value of the first signature with respect to a first irreducible polynomial; and
      amend the block to include the first and second signatures.

10. The system of claim 9, wherein the first function is a one-way function.

11. The system of claim 10, wherein the one-way function is a hash function.

12. The system of claim 9, wherein the non-transitory computer-readable media storing instructions further causes the processor to:

concatenate the first signature and the second signature to create a concatenated output; and create a signature output by mapping the concatenated output to the signature output using a hash function.

13. The system of claim 9, wherein an order of signatures used to create a signature output is defined before the block to be mined is received.

14. The system of claim 9, wherein the non-transitory computer-readable media storing instructions further causes the processor to create a chain of signatures, wherein each of the signatures is a multiplicative inverse value of a previous output with respect to a respective irreducible polynomial.

15. The system of claim 12, wherein the non-transitory computer-readable media storing instructions further causes the processor to:

amend the block to include the signature output.

16. A non-transitory computer-readable media storing instructions that, when executed by a computer processor of a computing system, cause the computing system to:

receive a block to be mined, the block comprising a header hash and a plurality of transactions;

create a first signature based on a first function, wherein inputs to the first function include the header hash and the plurality of transactions; and create a second signature based on a second function that is a multiplicative inverse function, wherein an input to the second function is the first signature and the second signature is a multiplicative inverse value of the first signature with respect to a first irreducible polynomial.

17. The non-transitory computer-readable media of claim 16, wherein the first function is a one-way function.

18. The non-transitory computer-readable media of claim 17, wherein the one-way function is a hash function.

19. The non-transitory computer-readable media of claim 16, wherein the first irreducible polynomial is a primitive polynomial.

20. The non-transitory computer-readable media of claim 16, wherein the instructions further cause the computing system to:

concatenate the first signature and the second signature to create a concatenated output;

create a signature output by mapping the concatenated output to the signature output using a hash function; and amend the block to include the signature output.

* * * * *